(12) United States Patent
Murakami et al.

(10) Patent No.: US 8,234,763 B2
(45) Date of Patent: Aug. 7, 2012

(54) PROCESSING METHOD OF SLOTTED HOLE

(75) Inventors: Yosuke Murakami, Fukuroi (JP);
Shingo Watanabe, Fukuroi (JP);
Yukihiko Kawaguchi, Fukuroi (JP);
Akihiro Morishita, Fukuroi (JP);
Takahiro Akatsuka, Fukuroi (JP)

(73) Assignee: Showa Corporation, Saitama (JP)

( * ) Notice: Subject to any disclaimer, the term of this patent is extended or adjusted under 35 U.S.C. 154(b) by 470 days.

(21) Appl. No.: 12/561,244

(22) Filed: Sep. 16, 2009

(65) Prior Publication Data

US 2010/0242244 A1    Sep. 30, 2010

(30) Foreign Application Priority Data

Mar. 26, 2009    (JP) ................................ 2009-077068

(51) Int. Cl.
*B24B 39/00*    (2006.01)

(52) U.S. Cl. ...................................................... 29/90.01
(58) Field of Classification Search ............... 20/90.01, 20/897.2, 592
See application file for complete search history.

(56) References Cited

U.S. PATENT DOCUMENTS

2007/0060429 A1 *    3/2007    Ono et al. ..................... 474/230

FOREIGN PATENT DOCUMENTS

JP    2007-302109    11/2007

* cited by examiner

*Primary Examiner* — John C Hong
(74) *Attorney, Agent, or Firm* — Babcock IP, PLLC

(57) ABSTRACT

In a processing method of a slotted hole for processing a hole in a processed subject and further processing a slot intersecting the hole, a process for generating a compressive residual stress c is applied to an inner diameter portion of the hole before the slot is processed.

6 Claims, 4 Drawing Sheets

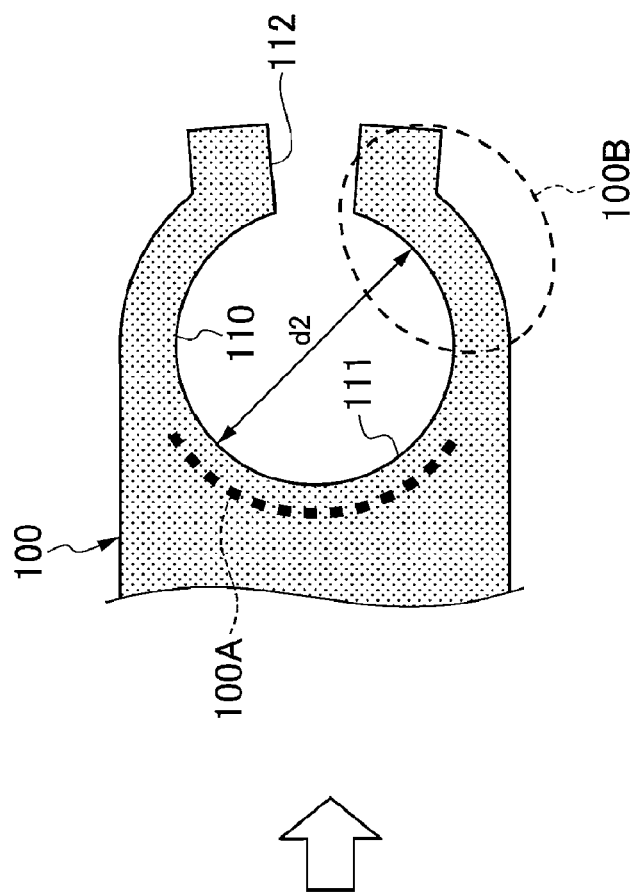
FIG.3
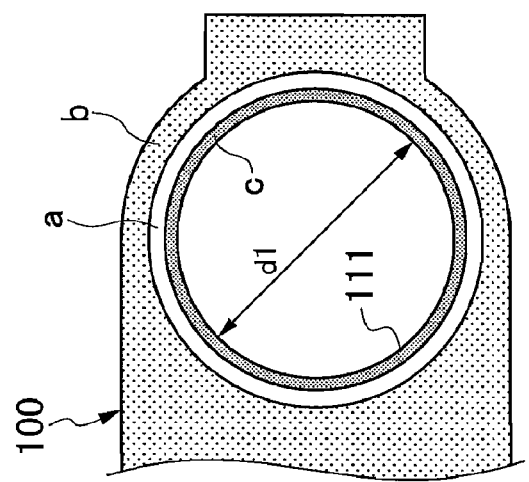

FIG.4
PRIOR ART
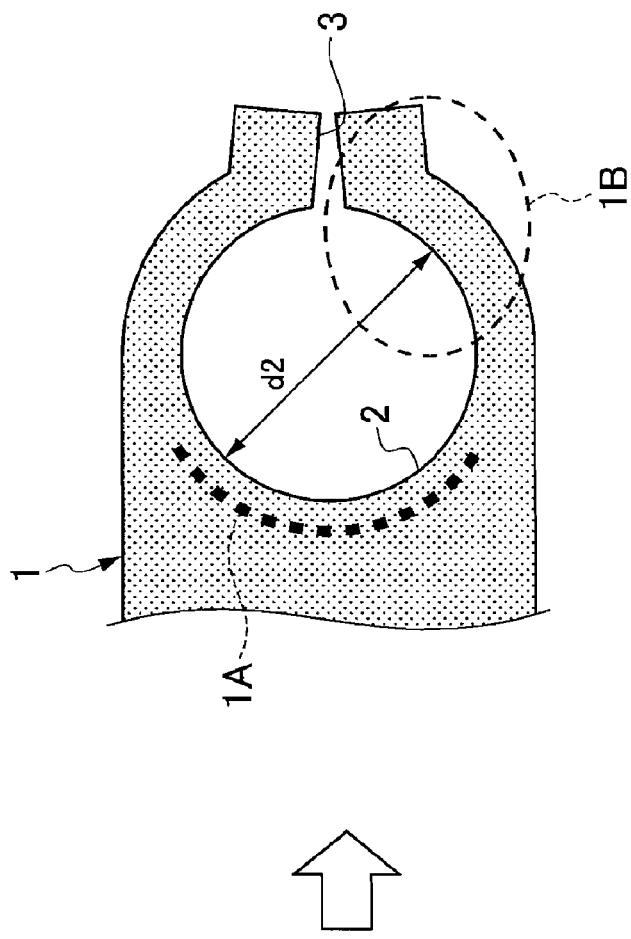
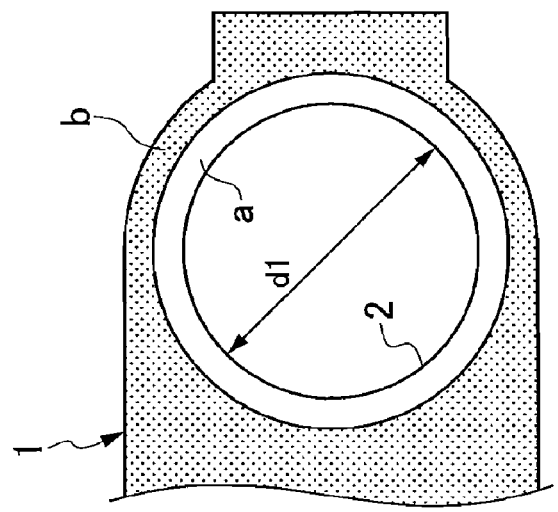

PROCESSING METHOD OF SLOTTED HOLE

BACKGROUND OF THE INVENTION

1. Field of the Invention

The present invention relates to a processing method for the creation of a slotted hole in a processed subject.

2. Description of the Related Art

In a vehicle such as a motor cycle, for example, in a vehicle body side bracket (a processed subject), as described in Japanese Unexamined Patent Publication No. 2007-302109 (Patent Document 1), right and left front forks are inserted to slotted holes provided in right and left sides of the vehicle body side bracket, and the front forks are clamped by fastening the slots by a split clamp bolt.

A conventional processing method for a slotted hole processes a hole 2 in a processed subject 1 such as a forged product, and processes a slot 3 intersecting the hole 2, as shown in FIG. 4. At this time, an original hole diameter d1 of the hole 2 caused by the hole processing of the processed subject 1 is reduced to a hole diameter d2 after the slot processing, due to a residual stress of the processed subject 1 caused by forging, a heat processing or the like. A tensile residual stress "a" (causing a contraction when released) is generated in an inner diameter portion of the hole 2 and a compressive residual stress "b" (causing an expansion when released) is generated in a periphery thereof, due to the hole processing of the processed subject 1. The tensile residual stress "a" released by the slot processing intersecting the hole 2 acts in a direction of contracting an inner peripheral portion of the hole 2. As a result, the hole diameter d1 of the hole 2 is reduced to the hole diameter d2. In the processed subject 1, if the hole diameter d2 of the hole 2 becomes smaller than an ideal dimension (a diameter close to the other subject), it becomes difficult to insert and assemble the other subject, and an obstacle is generated in an assembling step.

In this case, the following methods exist as a countermeasure for a diameter reduction after the slot processing of the slotted hole; however, all of them include a significant disadvantage.

(1) The original hole diameter d1 of the hole 2 formed by the hole processing of the processed subject 1 is processed larger in advance.

In this case, when the other subject is inserted to the hole 2 so as to be clamped, an inner diameter portion of the hole 2 is not well fitted to an outer diameter of the other subject, thereby causing a reduction of a slip load holding the other subject without relatively sliding and a reduction of a flexural fatigue strength in the clamped state of the other subject. In particular, if a high rigidity portion 1A having a partly high rigidity exists in the periphery of the hole 2 in the processed subject 1, deformation in the high rigidity portion 1A becomes small, deformation in a low rigidity portion 1B becomes large, and a curvature of the hole diameter d2 becomes small in the high rigidity portion 1A, and becomes large in the low rigidity portion 1B. As a result, the other subject comes to a condition that the other subject does not fit in the side of the high rigidity portion 1A.

(2) After the slot processing of the processed subject 1, upper and lower end surfaces around the hole 2 of the processed subject 1 are fixed from upper and lower sides, an inner diameter portion of the hole 2 is finished, and the hole diameter d2 is corrected to the ideal dimension.

In this case, since the processing number is increased, and the inner diameter portion of the hole 2 is processed in a state of being opened by the slot 3, it is hard to fix the processed subject 1, and there are disadvantages such as generation of fluttering, and reduction of processing dimension accuracy.

SUMMARY OF THE INVENTION

An object of the present invention is to easily suppress a diameter change after a slot processing of a slotted hole so as to improve an assembling property of the other subject.

The present invention relates to a processing method of a slotted hole for processing a hole in a processed subject and further processing a slot intersecting the hole. A process for generating a compressive residual stress is applied to an inner diameter portion of the hole before the slot is processed.

In accordance with the present invention, the following operations and effects can be obtained.

(a) The process for generating the compressive residual stress is applied to the inner diameter portion of the hole before the slot processing. Accordingly, the tensile residual stress "a" (causing a contraction when released) is generated in the inner diameter portion of the hole, and the compressive residual stress "b" (causing an expansion when released) is generated in the periphery thereof, by the hole processing of the processed subject; however, the compressive residual stress c (causing an expansion when released) is further applied to the surface layer of the inner diameter portion generating the tensile residual stress "a" of the hole by the process subsequent to the hole. Thereafter, if the slot intersecting the hole is processed, the compressive residual stress c released thereby acts in a direction of expanding the inner diameter portion of the hole so as to repel against the tensile residual stress "a". Accordingly, it is possible to control a diameter change amount (the hole diameter d1 before the processing, and the hole diameter d2 after the processing) of the hole before and after the slot processing, by controlling a magnitude of the compressive residual stress c generated in the inner diameter portion of the hole before the slot processing. It is possible to enlarge the diameter as well as to suppress the diameter reduction of the hole after the slot processing, thereby improving an assembling property of the other subject.

(b) Even if a high rigidity portion having a partly high rigidity exists in the periphery of the hole in the processed subject, a curvature of the high rigidity portion can maintain an ideal dimension (a curvature close to the other subject) which has been formed by the hole processing, even after the slot processing. Also, a curvature of a low rigidity portion can be approximated to an ideal dimension after the slot processing, by controlling the magnitude of the compressive residual stress c generated in the inner diameter portion of this portion. As a result, it is possible to improve an assembling property of the other subject.

When the other subject is inserted to the hole so as to be clamped, the inner diameter portion of the hole is well fitted to the outer diameter of the other subject, and it is possible to secure a slip load holding the other subject without relatively sliding and to achieve an improvement of a flexural fatigue strength in the clamped state of the other subject.

In the preferred method of the invention, the process for generating the compressive residual stress is a burnishing process.

In accordance with the above inventions, the following operation and effects can be obtained.

(c) It is possible to form the surface layer of the inner diameter portion of the hole as a smooth finished surface by compressing so as to press and smoothen, in accordance with the burnishing process, and it is possible to apply the compressive residual stress to the inner diameter portion.

In the above preferred method of the invention, the processed subject is a vehicle body side bracket of a vehicle, and a front fork is capable of being slot-fastened to a slotted hole of the vehicle body side bracket.

In accordance with the above invention, the following operation and effects can be obtained.

(d) In the vehicle body side bracket, the items (a) to (c) mentioned above can be applied to the processing of the slotted hole slot-fastening the front fork.

In the above preferred method of the invention, the processed subject is an axle bracket of a vehicle, and an axle is capable of being slot-fastened to a slotted hole of the axle bracket.

In accordance with the above invention, the following operation and effects can be obtained.

(e) In the axle bracket, the items (a) to (c) mentioned above can be applied to the processing of the slotted hole slot-fastening the axle.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIG. 3 is a schematic view showing a processing principle of a slotted hole according to a method of the present invention; and FIG. 4 is a schematic view showing a processing principle of a slotted hole according to a conventional method.

DESCRIPTION OF THE PREFERRED EMBODIMENTS

Figure 1:
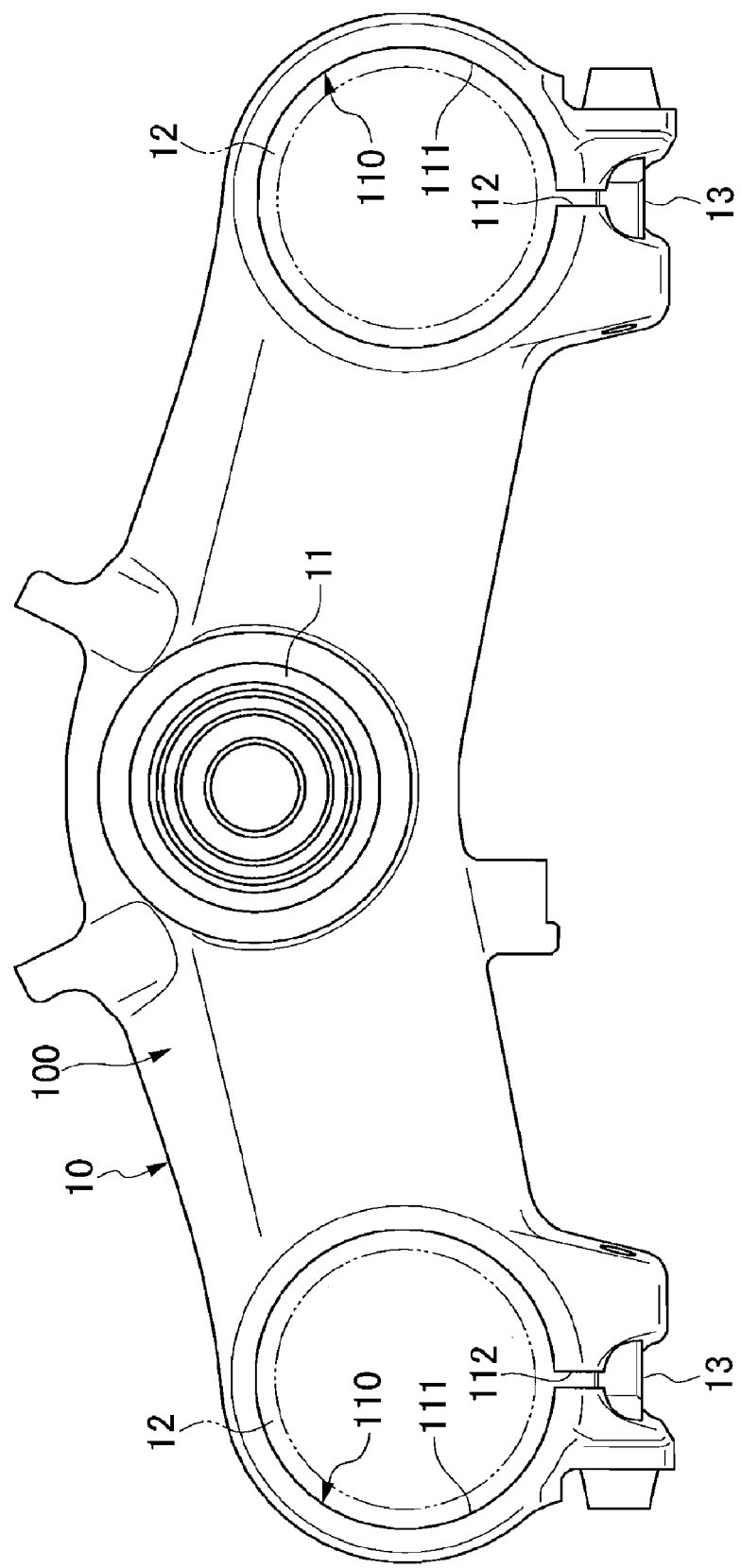
FIG. 1 is a plan view showing a vehicle body side bracket.
Figure 2:
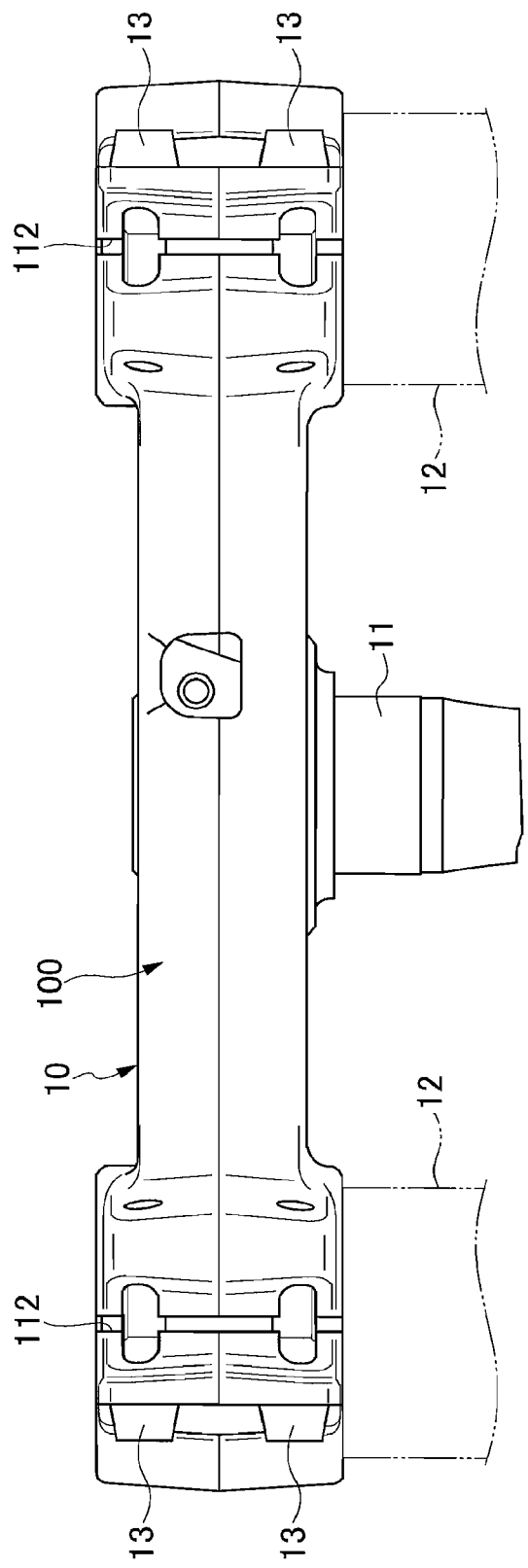
FIG. 2 is a front elevational view showing the vehicle body side bracket.

A vehicle body side bracket 10 of a motor cycle shown in FIGS. 1 and 2 is a processed subject 100 corresponding to an example to which the present invention is applied. The vehicle body side bracket 10 has a steering shaft 11 in its center, the steering shaft 11 is pivoted to a head pipe of a vehicle body frame so as to be freely steered, and right and left front forks 12 (the other subjects) are inserted to slotted holes 110 provided in right and left sides, and the front fork 12 is clamped by fastening a slot 112 by a slot fastening bolt 13.

The slotted hole 110 of a processed subject 100 is processed in accordance with the following procedures.

(1) A raw material of the processed subject 100 is prepared by being forged, heat processed or the like.

(2) The hole 111 is processed by applying a cutting process by drilling or the like to the processed subject 100. The processed subject 100 generates a tensile residual stress "a" in an inner diameter portion of the hole 111, and generates a compressive residual stress "b" in the periphery thereof, as shown in FIG. 3.

(3) A compressive residual stress c is generated in the inner diameter portion of the hole 111, by applying a burnishing process, as shown in FIG. 3, to the hole 111 in the item (2) mentioned above before the slot processing of the processed subject 100. The compressive residual stress c compresses a surface layer in the inner diameter portion generating the tensile residual stress "a" in the hole 111 so as to press and smoothen by a burnishing tool, and is generated in such a manner as to be clapped on the surface layer generating the tensile residual stress "a". A magnitude of the compressive residual stress c generated in the inner diameter portion of the hole 111 can be controlled by controlling a compression amount applied to the surface layer of the hole 111 by the burnishing tool. This processing can be carried out by using, as the burnishing tool, a tool which is provided with a cutting chip in a leading end surface and a burnishing indenting tool (a roller or a ball) in an outer peripheral surface, rolling the inner diameter portion of the hole 111 by the burnishing indenting tool at the same time as carrying out the hole processing in the item (2) mentioned above, and compressing the surface layer so as to press and smoothen. In this case, this process can be carried out by rolling the inner diameter portion of the hole 111 by a roller provided in an outer peripheral surface of an inner diameter roller burnishing tool after carrying out the hole processing in the item (2) mentioned above by means of a drilling or the like, and compressing the surface layer so as to press and smoothen.

(4) The slotted hole 110 is obtained by processing the slot 112 intersecting the hole 111 in the item (3) mentioned above of the processed subject 100 in accordance with a cutting process of an end mill or the like.

In accordance with the present embodiment, the following operations and effects can be obtained.

(a) The process for generating the compressive residual stress is applied to the inner diameter portion of the hole 111 before the slot processing. Accordingly, the tensile residual stress "a" (causing a contraction when released) is generated in the inner diameter portion of the hole 111, and the compressive residual stress "b" (causing an expansion when released) is generated in the periphery thereof, by the hole processing of the processed subject 100; however, the compressive residual stress c (causing an expansion when released) is further applied to the surface layer of the inner diameter portion generating the tensile residual stress "a" of the hole 111 by the process subsequent to the hole processing. Thereafter, if the slot 112 intersecting the hole 111 is processed, the compressive residual stress c released thereby acts in a direction of expanding the inner diameter portion of the hole 111 so as to repel against the tensile residual stress "a". Accordingly, it is possible to control a diameter change amount (the hole diameter d1 before the processing, and the hole diameter d2 after the processing) of the hole 111 before and after the slot processing, by controlling a magnitude of the compressive residual stress c generated in the inner diameter portion of the hole 111 before the slot processing. It is possible to enlarge the diameter as well as to suppress the diameter reduction of the hole 111 after the slot processing, thereby improving an assembling property of the other subject.

(b) Even if a high rigidity portion 100A having a partly high rigidity exists in the periphery of the hole 111 in the processed subject 100, a curvature of the high rigidity portion 100A can maintain an ideal dimension (a curvature close to the other subject) which has been formed by the hole processing, even after the slot processing. Also, a curvature of a low rigidity portion 100B can be approximated to an ideal dimension after the slot processing, by controlling the magnitude of the compressive residual stress c generated in the inner diameter portion of this portion. As a result, it is possible to improve an assembling property of the other subject.

When the other subject is inserted to the hole 111 so as to be clamped, the inner diameter portion of the hole 111 is well fitted to the outer diameter of the other subject, and it is possible to secure a slip load holding the other subject without relatively sliding and to achieve an improvement of a flexural fatigue strength in the clamped state of the other subject.

(c) It is possible to form the surface layer of the inner diameter portion of the hole 111 as a smooth finished surface by compressing so as to press and smoothen, in accordance with the burnishing process, and it is possible to apply the compressive residual stress to the inner diameter portion.

(d) In the vehicle body side bracket 10, the items (a) to (c) mentioned above can be applied to the processing of the slotted hole 110 slot-fastening the front fork 12.

In this case, the processed subject to which the present invention is applied may be constructed by an axle bracket of the vehicle, and may be structured such that an axle can be slot-fastened to a slotted hole of the axle bracket.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

According to the present invention, in the processing method of the slotted hole for processing the hole in the processed subject, and further processing the slot intersecting the hole, the process generating the compressive residual stress is applied to the inner diameter portion of the hole before processing the slot. Accordingly, it is possible to easily suppress the diameter change after the slot processing of the slotted hole, and it is possible to improve an assembling property of the other subject.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A processing method of a slotted hole for processing a hole in a processed subject and further processing a slot intersecting the hole, comprising the steps of generating a compressive residual stress in an inner diameter portion of the hole before the slot is processed to control a hole diameter after the slot processing, by controlling a magnitude of the compressive residual stress generated in the inner diameter portion of the hole before the slot processing.

2. The processing method of a slotted hole according to claim 1, wherein the compressive residual stress is generated by a burnishing process.

3. The processing method of a slotted hole according to claim 2, wherein the processed subject is a vehicle body side bracket of a vehicle, and a front fork is capable of being slot-fastened to a slotted hole of the vehicle body side bracket.

4. The processing method of a slotted hole according to claim 2, wherein the processed subject is an axle bracket of a vehicle, and an axle is capable of being slot-fastened to a slotted hole of the axle bracket.

5. The processing method of a slotted hole according to claim 1, wherein the processed subject is a vehicle body side bracket of a vehicle, and a front fork is capable of being slot-fastened to a slotted hole of the vehicle body side bracket.

6. The processing method of a slotted hole according to claim 1, wherein the processed subject is an axle bracket of a vehicle, and an axle is capable of being slot-fastened to a slotted hole of the axle bracket.

* * * * *